United States Patent [19]

Ishii

[11] Patent Number: 4,479,566
[45] Date of Patent: Oct. 30, 1984

[54] STOPPER FOR CASTER

[75] Inventor: Hiroyuki Ishii, Tokyo, Japan

[73] Assignee: Sugatsune Industrial Co. Ltd., Tokyo, Japan

[21] Appl. No.: 333,740

[22] Filed: Dec. 23, 1981

[51] Int. Cl.³ .......................................... F16D 63/00
[52] U.S. Cl. ................................... 188/1.12; 188/69;
16/35 R; 74/483 PB
[58] Field of Search .................... 74/527, 483 PB;
16/35 R; 188/1.12, 69, 31

[56] References Cited

U.S. PATENT DOCUMENTS

| 2,946,237 | 7/1960 | Hebert | 74/483 PB X |
| 3,571,842 | 3/1971 | Fricke | 16/35 R |
| 3,772,733 | 11/1973 | Stosberg et al. | 16/35 R |
| 4,077,087 | 3/1978 | Mooney | 188/1.12 X |
| 4,110,866 | 9/1978 | Ishii | 16/35 R |

FOREIGN PATENT DOCUMENTS

| 1654742 | 3/1971 | Fed. Rep. of Germany | 16/35 R |
| 2334324 | 1/1975 | Fed. Rep. of Germany | 16/35 R |
| 2098059 | 1/1982 | United Kingdom | 16/35 R |

Primary Examiner—James A. Leppink
Assistant Examiner—Frank H. McKenzie, Jr.
Attorney, Agent, or Firm—George B. Oujevolk

[57] ABSTRACT

A stopper for a caster which has a push-button slidably inserted into a mounting hole radially perforated at a frame for journaling wheels, and a stopper rotor so mounted rotatably in parallel with an axle at the push-button as to be elastically urged by a spring in an outward direction and for stoppers formed at the ends thereof on the peripheries of the wheels. An actuator is formed at the stopper rotor, and a cam groove is formed in the mounting hole of the push-button for stepwisely engaging the actuator by the pressing operation of the push-button and the recoiling operation of the spring. Thus, the wheels can be readily locked and unlocked effectively with only one push-button repeatedly operated in pressing the push-button.

2 Claims, 9 Drawing Figures

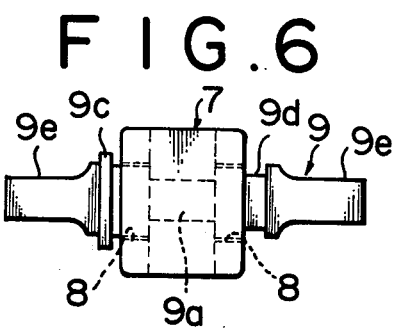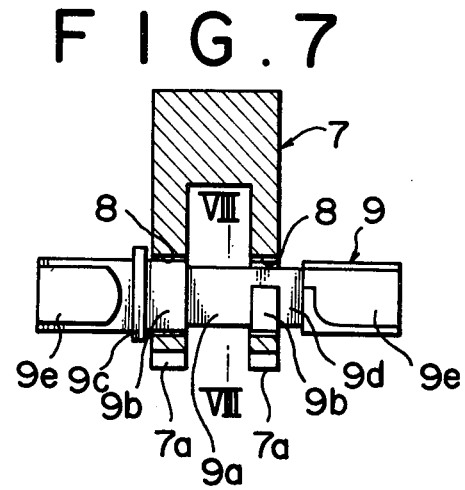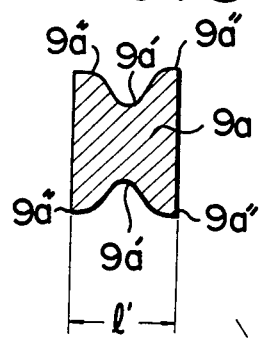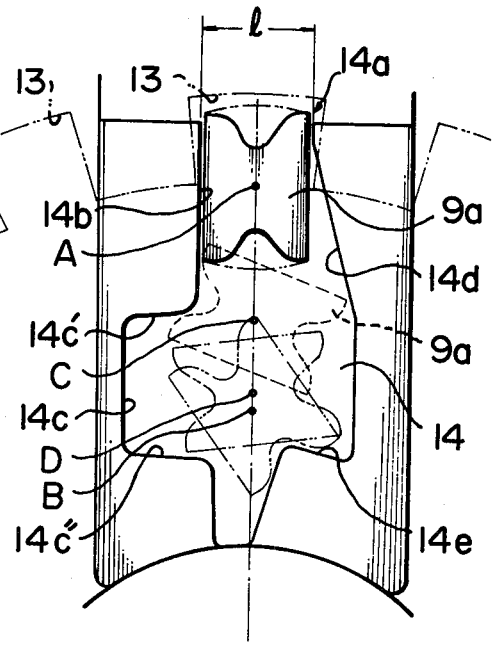

4,479,566

STOPPER FOR CASTER

BACKGROUND OF THE INVENTION

This invention relates to a caster and, more particularly, to improvements in a stopper unit for a caster.

A conventional caster is mounted, for example, at each leg or the like of a chair, a wagon deck, a part conveying box and so forth and is thus used to facilitate the movement thereof. The caster is conveniently provided to stop them at a predetermined position in a predetermined direction together with a stopper unit attached thereto for locking its wheel.

There are known at present conventional stopper units of various structures, most of which employ locking buttons and lock releasing buttons.

The stopper of this type is constructed to lock a stopper by pushing a locking button against the elastic force of a spring for urging the locking button and thereby engaging the stopper with a recess or the like formed on the periphery of a wheel and to release the lock of the stopper by pressing a lock releasing button to thereby disengage the spring and returning the stopper.

Since the locking button and the lock releasing button of the conventional stopper unit of the above described structure are generally operated to lock or release the lock of the stopper with a leg in a parallel alignment, they have difficulties such that the locking and the lock releasing operations are hard to carry out and that the selection of locking or lock releasing operation can be easily mistaken. Inasmuch as the locking button is retained in a pressed position in the stopper of this type structure, the conventional stopper further has such drawbacks and disadvantages that its connector to the spring tends to readily wear, the lock can be easily released with a slight external force or vibration applied thereto, or its production cost becomes expensive due to large number of parts.

SUMMARY OF THE INVENTION

Accordingly, a primary object of this invention is to provide a stopper unit for a caster in which all the aforementioned disadvantages and drawbacks of the conventional stopper for a caster can be eliminated and its wheel can be readily locked and unlocked effectively with only one push-button repeatedly operated in pressing the push-button.

Another object of this invention is to provide a stopper unit for a caster which can be constructed with extremely least number of parts inexpensively.

A further object of this invention is to provide a stopper for a caster which can be smoothly operated with improved operability.

Still another object of this invention is to provide a stopper for a caster in which locking and lock releasing operations can be effectively conducted even with plays between parts and with parts of irregular size.

Still another object of the invention is to provide a stopper for a caster which can be more simply assembled than a conventional one.

The above and other related objects and features of the invention will be apparent from a reading of the following description of the disclosure together with the accompanying drawings and the novelty thereof pointed out in the appended claims.

BRIEF DESCRIPTION OF THE DRAWINGS

FIG. 6 is a plan view showing the push-button and the stopper rotor in the stopper unit of the invention;

FIG. 7 is a longitudinal sectional view of the stopper unit shown in FIG. 6;

FIG. 8 is an enlarged sectional view of the stopper unit taken along the line VIII—VIII in FIG. 7; and FIG. 9 is an explanatory view showing the relationship between the cam groove and the stopper rotor in operation of the stopper unit.

DESCRIPTION OF THE PREFERRED EMBODIMENTS

Figure 1:
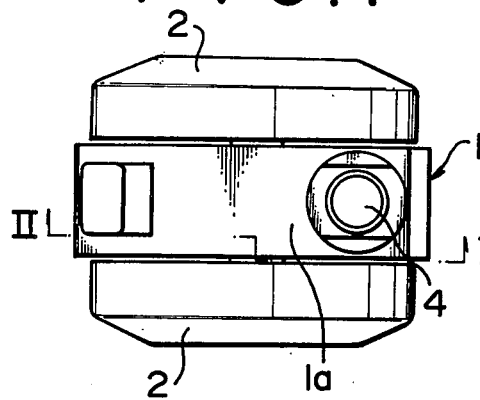
FIG. 1 is a plan view of a caster having a stopper unit constructed according to this invention.
Figure 2:
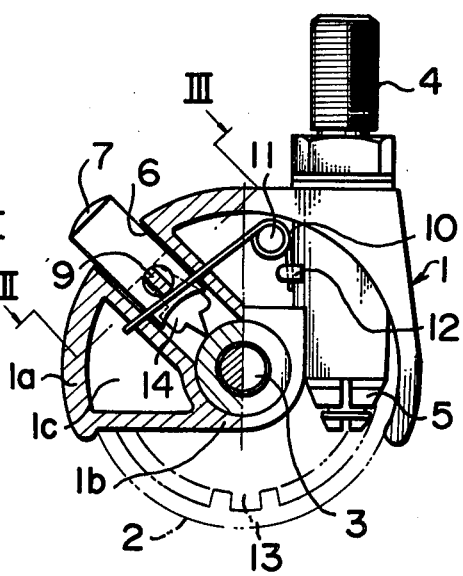
FIG. 2 is a sectional view of the caster taken along the line II—II in FIG. 1.
Figure 4:
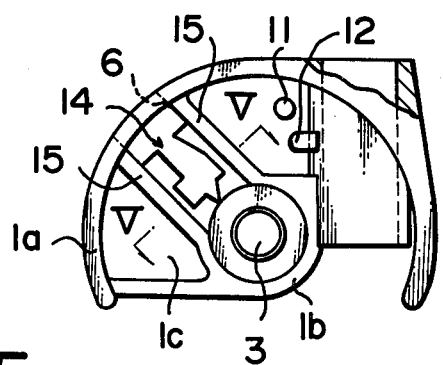
FIG. 4 is a side view showing the frame of the caster of the invention.

Reference is made to drawings, particularly to FIGS. 1, 2 and 4 showing one preferred embodiment of the stopper unit for a caster constructed according to this invention, wherein like reference numerals designate the same or equivalent components and parts in other views.

FIGS. 1, 2 and 4, a caster 1 is constructed to have a frame 1 integrally formed of an outer wall 1a of substantially semispherical shape in side view, a central boss 1b and a middle wall 1c for connecting the outer wall 1a to the boss 1b, wheels 2 and 2 rotatably supported at both sides of the frame 1 through an axle 3, and a mounting shaft 4 disposed eccentrically to one side and rotatably supported through a bushing 5.

Figure 3:
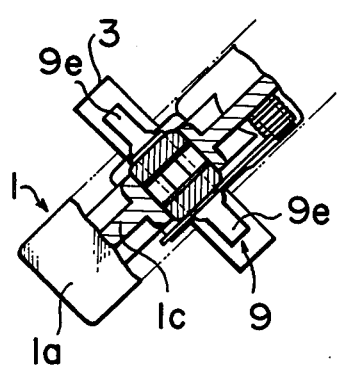
FIG. 3 is a sectional view of the caster taken along the line III—III in FIG. 2.

As shown in FIGS. 2 through 4, a mounting hole 6 is perforated radially from the center of the frame 1 through the outer wall 1a and the middle wall 1c, and a push-button 7 is slidably inserted into the mounting hole 6.

As illustrated in FIGS. 6 and 7, legs 7a and 7a are set at a suitable interval at both right and left lower sides of the push-button 7, and a stopper rotor 9 is rotatably inserted into holes 8 and 8 so perforated at both the legs 7a and 7a as to be opposite one another in parallel with the axle 3.

As depicted in FIGS. 6 through 8, the stopper rotor 9 is formed in a shaft shape and is supported at the middle part by an actuator 9a and at both right and left sides by bearings 9b and 9b of circular cross section, and to have at one outer side, a flange 9c, at the other outer side with an annular groove 9d, and at both right and left ends with flat stoppers 9e and 9e. The bearings 9b and 9b are rotatably inserted into holes 8 and 8 of the push-button 7. The actuator 9a is disposed between the legs 7a and 7a. The flange 9c and a spring 10 engaged at one end with the annular groove 9d as shown in FIG. 2 serve to prevent the removal of the stopper rotor 9 from the push-button 7.

As shown in FIG. 8, the actuator 9a is so formed biaxially at a right angle therebetween as to be long in one axial direction and is also formed of recesses 9a' and 9a' at the center of both ends in the long axial direction as well as having projections 9a" and 9a" at both right and left sides thereof to be thus rotatably guided within a cam groove to be described in greater detail.

The spring 10 is engaged at one end with a projection 11 formed at the middle wall 1c of the frame 1 and at the other end with a pawl 12 of the frame 1. The push-button 7 and the stopper rotor 9 are elastically urged by the spring 10 in the mounting hole 6 with the recoiling force of the spring 10 in a radially outward direction. Thus, the stoppers 9e and 9e of the stopper rotor 9 are removably engaged with the stopper recesses 13 formed on the peripheries of the wheels 2 and 2 thereby locking the wheels 2 and 2. Thus, the push-button 7 is axially urged out of the frame 1 to thereby move the stopper rotor 9. In this manner, the stoppers 9e and 9e and the stopper recess 13 are disengaged to thereby release the lock of the wheels.

A cam groove 14 is cut out on the middle wall 1c of the frame 1 in the mounting hole 6, and the actuator 9a of the stopper rotor 9 is internally mounted in the cam groove 14.

As evidently illustrated in FIG. 9, the cam groove 14 is so formed that the width l of the opening 14a is substantially equal to or slightly wider than the width l' of the actuator 9a in a short-axis direction. The opening 14a is so formed at one side edge of a vertical edge 14b that the middle part is formed with a rectangular recess 14c lowered outwardly and is also so formed along the other side with an oblique edge 14d inclined outwardly and the lower side is formed of an upward step 14e. Thus, the actuator 9a is so formed as to be rotatably guided and engaged and retained stepwisely in its moving direction by the pushing operation of the stopper rotor 9 and the recoiling operation of the spring 10.

Figure 5:
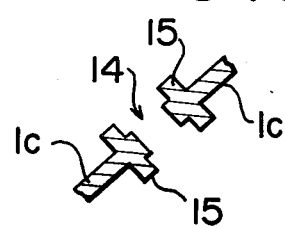
FIG. 5 is a sectional view of the caster taken along the line V—V in FIG. 4.

As depicted in FIGS. 4 and 5, ribs 15 and 15 are longitudinally formed at both sides of the cam groove 14. Thus, the legs 7a and 7a of the push-button 7 are engaged and guided between the ribs 15 and 15 so as to slide in predetermined direction.

In the stopper thus constructed, the push-button 7 and the stopper rotor 9 are elastically urged by the spring 10 in an outward direction. As shown in FIG. 9, the actuator 9a is at this time located at point A as retained in a longitudinally long state along the vertical edge 14b of the opening 14a of the cam groove 14, and the stoppers 9e and 9e are engaged with the stopper recesses 13 and 13, of the wheels 2 and 2, respectively to allow the wheels 2 and 2 to be locked.

When the push-button 7 is pressed against the elastic force of the spring 10 in the aforementioned locked state, the stopper rotor 9 is synchronized with this operation to be thus depressed. Accordingly, the actuator 9a is pressed from the position A shown in FIG. 9 into the cam groove 14 in the same attitude. In this manner, the lower one side projection 9a'' of the actuator 9a makes contact with the step 14e by this pressing operation, and is accordingly rotated counterclockwise to be inclined counterclockwise as designated by the position B in FIG. 9.

When the pressing force of the push-button 7 is then released, the push-button 7 is urged out by the spring 10, and the actuator 9a is accordingly raised upwardly in the same attitude as that at the position B in FIG. 9. Thus, the projection 9a'' will make contact with the upper edge 14c' of the recess 14c. In this manner, the stopper rotor 9 is further rotated counterclockwise, and the other projection 9a'' will make contact with the vertical edge 14b and the oblique edge 14d to be engaged therewith, and is thus retained at the position C to allow the stopper rotor to be released from locking.

When the push-button 7 is depressed in the aforementioned lock release state, the actuator 9a of the stopper rotor 9 operated synchronously with this operation is lowered so that the one side end face thereof makes contact with the step 14e of the cam groove 14.

The actuator 9a is rotated toward the lower edge 14c'' of the recess 14c disposed lower than the step 14e and accordingly counterclockwise in the state as designated by two-dotted broken lines at this time. When the push-button 7 is then released, the actuator 9a will rise to the original position in the same attitude as before. Thus, the other side end face of the actuator 9a will make contact with the upper edge 14c' of the recess 14c. Accordingly, the actuator 9a will further rotate counterclockwise to the state directed in a longitudinally long state. Thus, the actuator 9a is raised while being guided by the vertical edge 14b toward the opening 14a of the cam groove 14, and is thus returned to the position A. In this manner, the stopper 9e is engaged with the stopper recess 13 and is thus locked therewith.

It should be understood from the foregoing description that since the stopper for the caster constructed according to this invention is provided to lock or release the lock of the wheels 2 and 2 merely by the pushing operations of a sole push-button 7, it can improve the operability as compared with the conventional two-push-button type stopper for the caster, can also confirm the locked or lock released state in accordance with the length of the projected push-button 9 from the mounting hole 6.

It should also be appreciated that since the stopper for the caster of this invention is constructed to retain itself in the lock released state by the relative engagement of the actuator 9a of the stopper rotor 9 passed through the push-button 7 with the cam groove 14 formed in the mounting hole 6, it can be smoothly operated, and since the actuator 9a is located at the center of the push-button 7 in the stopper, the pressing force of the push-button 7 is provided to always urge the center of the stopper rotor 9 and accordingly the locking and the lock releasing operations can be effectively conducted even with plays between parts and with parts of irregular size.

It should also be understood that since the stopper for the caster of this invention consists of less number of parts such as a push-button 7, a stopper rotor 9 and a spring 10 in addition to the frame 1, it can be extremely simply constructed, and since the stopper rotor 9 can be inserted laterally into the holes 8 and 8 after the push-button 7 is inserted into the mounting hole 6, it can be more simply assembled than the conventional one inexpensively.

What is claimed is:

1. A caster, comprising in combination:
   (a) a frame (1) with wheels (2) at two sides of the frame and stopper recesses (13) along the periphery of the wheels;
   (b) a radial narrow mounting aperture (6) defined in said frame, a cam groove (14) with narrow outer and inner parts, and a wide central part defined in said mounting aperture (6), said cam groove (14) having an open outer end (14a), an oblique edge (14d) on one side of said groove inclined from the cam groove wide central part of the narrower outer part, a step (14e) defined in the inner part of said groove, a central cam recess (14c) with an upper edge (14c'') and a lower edge (14c''') on the other side of the central part of said groove, so that said oblique edge (14d) and said cam recess (14c) form an enlarged chamber in the central part of said cam groove (14), and said step (14e) and lower edge (14c''') form a narrow chamber in the inner part of said cam groove;

(c) a push-button (7) with a lower portion, mounted in said aperture (6) said lower portion having push-button legs (7a) with leg apertures (8), a stopper rotor (9) rotatably held in said leg apertures (8), said stopper rotor having a middle part and two ends;

(d) an elongated actuator (9a) of a width across its shortest dimension slightly smaller than the cam groove open outer end (14a), said actuator (9a) being mounted in said cam groove (14) and affixed to said stopper rotor middle part, stopper means (9a) disposed for engaging said stopper recesses (13) at each end of said stopper rotor (9), spring means (10) affixed to said frame and engaging said stopper rotor (9) urging the push-button (7) out of the frame (1) and preventing the removal of the stopper rotor (9) from said push-button legs (7a), projections (9'') on the outer ends of said actuator (9a), whereby, when said push-button is pushed and said stopper means (9e) engage a stopper recess (13), the actuator (9a) is pressed into the cam groove (14) and a projection (9'') contacts the step (14e) rotating the actuator and the stopper rotor (9), when the push-button is released, the actuator (9a) is raised upward so that a projection (9a'') will engage the upper edge (14c') of said central cam recess (14c); when the push-button is depressed in the lock-released state, the actuator (9a) is lowered and a projection (9a'') contacts the step so that the actuator is rotated towards the lower edge (14c''), and, when the push-button is released, another end projection (9a'') of the actuator will contact the upper edge (14c') of the recess (14), rotating the actuator further and be guided to the opening (14a) of the cam groove, the stopper (9e) is then engaged with the stopper recess and locked therein.

2. A caster, comprising in combination:

(a) a frame (1) with wheels (2) at two sides of the frame and stopper recesses (13) along the periphery of the wheels;

(b) a radial mounting aperture (6) defined in said frame, a cam groove (14) with a narrow outer and a narrow inner part, and a wide central part, defined in said mounting aperture (6), projection engaging means (14e, 14c, 14c', 14c'') in said cam groove (14), said cam groove defining a travel path with turning stations;

(c) a push-button (7) with a lower portion, mounted in said aperture (6), said lower portion having push-button legs (7a) with leg apertures (8), a stopper rotor (9) rotatably held in said leg apertures (8), said stopper rotor having a middle part and two ends, stopper means (9e) disposed for engaging said stopper recesses (13) at each end of said stopper rotor (9), spring means (10) affixed to said frame and engaging said stopper rotor (9) urging the push-button out of said frame;

(d) an actuator (9a) affixed to said stopper rotor middle part, projections on said actuator, disposed so as to be engaged by said projection engaging means in said cam groove (14), which when engaged will rotate the actuator and the stopper rotor affixed to the actuator, or hold the actuator and stopper rotor in a predetermined position, so that when the push-button is pushed and said stopper means (9e) engage a stopper recess (13) the stopper rotor and actuator are held in position in said travel path by one of the engaging means until the push-button is again depressed.

* * * * *